US008406950B2

(12) United States Patent
Erb et al.

(10) Patent No.: US 8,406,950 B2
(45) Date of Patent: Mar. 26, 2013

(54) OPTOELECTRONIC SENSOR

(75) Inventors: Frank Erb, Denzlingen (DE); Matthias Feser, Waldkirch (DE)

(73) Assignee: Sick AG, Waldkirch (DE)

( * ) Notice: Subject to any disclaimer, the term of this patent is extended or adjusted under 35 U.S.C. 154(b) by 238 days.

(21) Appl. No.: 12/970,236

(22) Filed: Dec. 16, 2010

(65) Prior Publication Data

US 2011/0153139 A1   Jun. 23, 2011

(30) Foreign Application Priority Data

Dec. 17, 2009  (EP) .................................. 09179696

(51) Int. Cl.
*G05D 1/00* (2006.01)
(52) U.S. Cl. .......................... 701/28; 356/614
(58) Field of Classification Search ............. 701/23–28; 356/3–5.05, 614; 703/2
See application file for complete search history.

(56) References Cited

U.S. PATENT DOCUMENTS

| | | | | |
|---|---|---|---|---|
| 5,467,283 | A * | 11/1995 | Butsuen et al. | 701/301 |
| 6,265,725 | B1 | 7/2001 | Moll et al. | |
| 6,480,270 | B1 * | 11/2002 | Studnicka et al. | 356/141.1 |
| 6,759,649 | B2 * | 7/2004 | Hipp | 250/234 |
| 8,018,353 | B2 * | 9/2011 | Schleifer et al. | 340/937 |
| 8,059,263 | B2 * | 11/2011 | Haberer et al. | 356/5.01 |
| 2006/0100783 | A1 * | 5/2006 | Haberer et al. | 701/301 |

FOREIGN PATENT DOCUMENTS

| | | |
|---|---|---|
| DE | 103 07 232 A1 | 9/2004 |
| DE | 20 2005 004 466 U1 | 10/2005 |
| EP | 1 470 967 A1 | 10/2004 |
| GB | 2 413 449 A | 10/2005 |
| WO | 2005/023613 A1 | 3/2005 |
| WO | 2006/015894 A1 | 2/2006 |

OTHER PUBLICATIONS

Gourgand et al, Choice of the Guide Path Layout for an AGV-based Material Handling System, 1995 INRIA/IEEE Symposium on Emerging Technologies and Factory Automation, 1995, pp. 475-483.*

European Search Report, dated May 17, 2010, six (6) pages.

* cited by examiner

*Primary Examiner* — Russell Frejd
(74) *Attorney, Agent, or Firm* — Nath, Goldberg & Meyer; Jerald L. Meyer; Sanjana Mangalagiri

(57) ABSTRACT

An optoelectronic sensor (10), in particular a laser scanner, for a vehicle (100) which moves on a path (104) bordered at both sides, the optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in position and/or extent, wherein a safety output (32) is provided via which a stop signal or a brake signal can be output to the vehicle (100) by the evaluation unit (30, 34) on the recognition of a protected field intrusion. The evaluation unit (30, 34) is furthermore configured to recognize borders (110) of the path (104) from the electric signals and to fit the protected field (102) dynamically into the borders (110).

29 Claims, 4 Drawing Sheets

Figure 1:
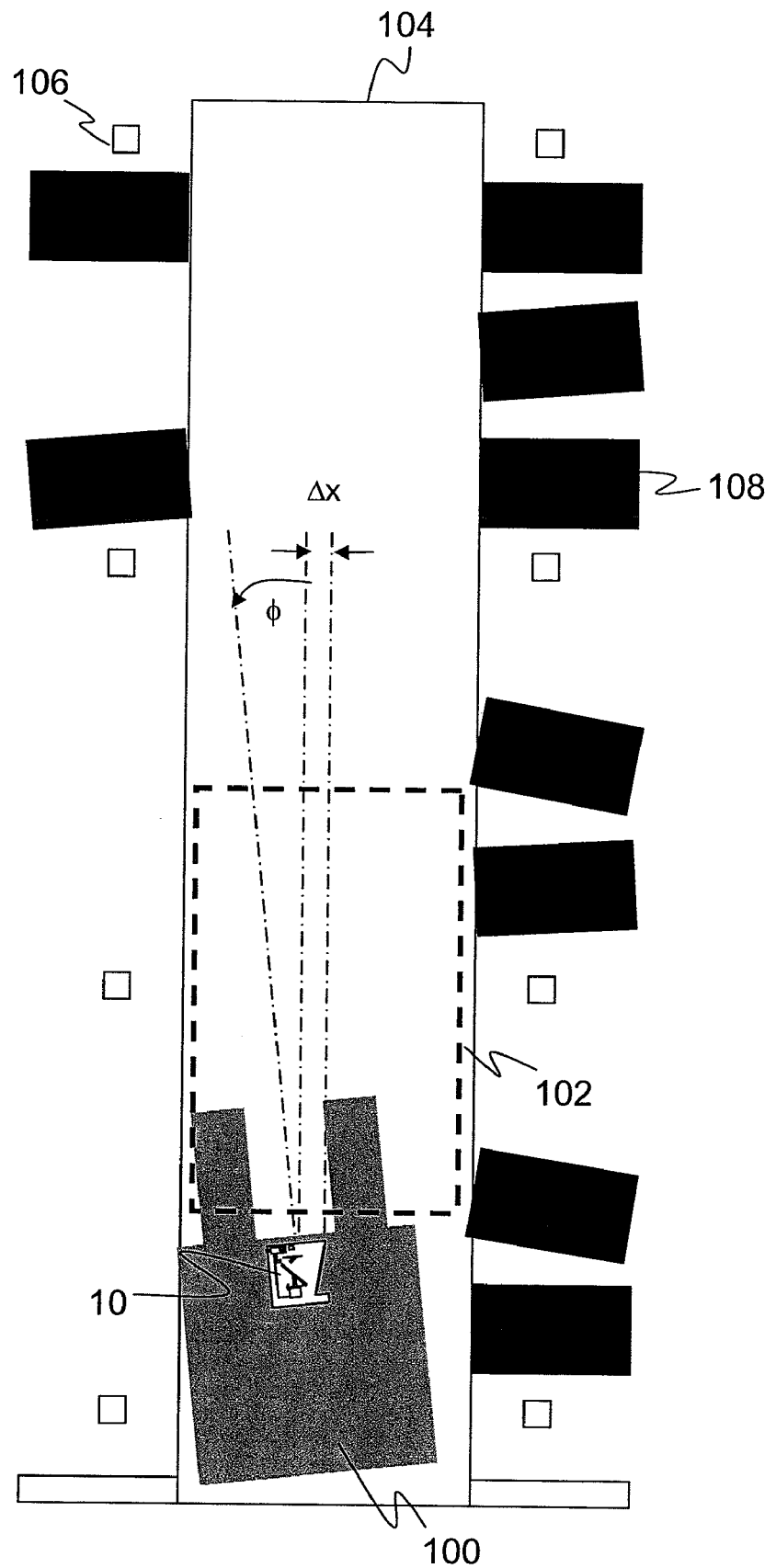

Figure 2a
Figure 2b
Figure 2c
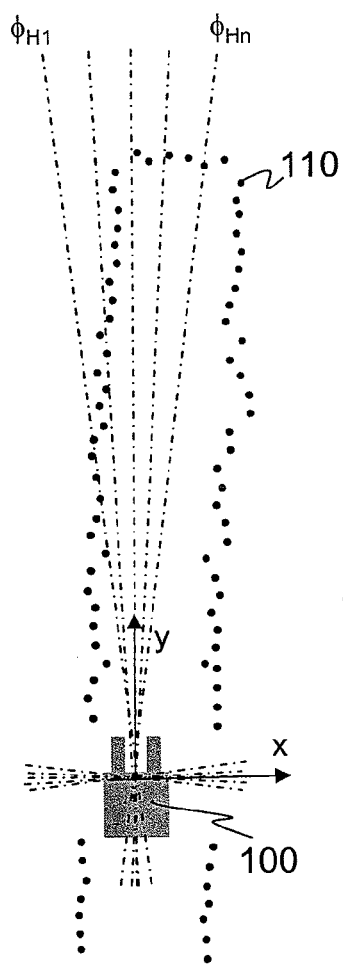
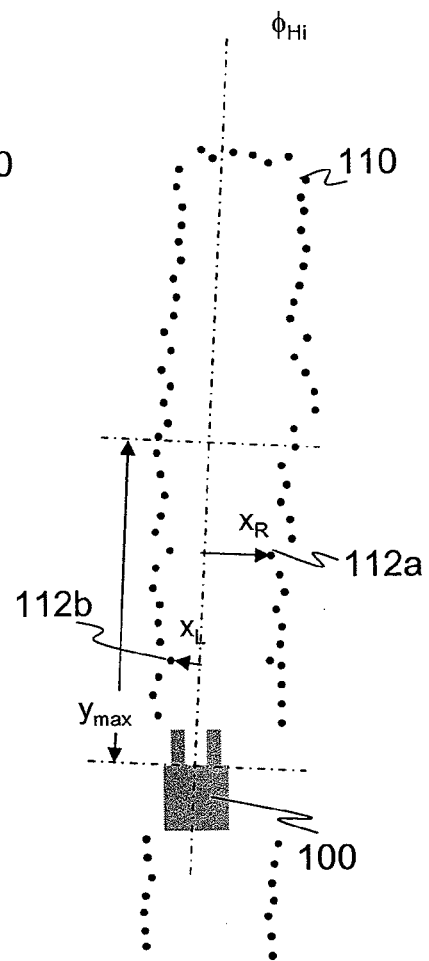
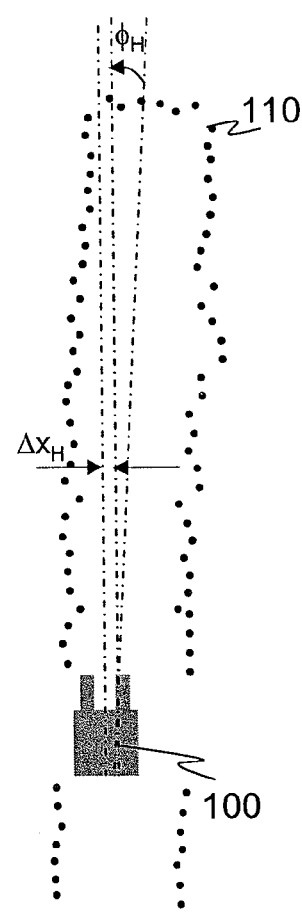

OPTOELECTRONIC SENSOR

The invention relates to an optoelectronic sensor for a vehicle which moves on a path bordered at both sides as well as to a method for monitoring the environment of a vehicle in accordance with the preamble of claims 1 and 11 respectively.

Optoelectronic sensors have been used for a fairly long time as driver assistance systems or for the automatic navigation of vehicles. Since an important function is recognizing obstacles, sensors of this kind are usually adapted for distance determination. Different processes are known for this purpose, for example stereoscopic camera systems.

A further distance-measuring sensor type is a laser scanner which transmits brief light pulses and measures the time of flight of light up to the reception of reflections of the objects in the field of view. The scan beam is periodically deflected over an angular range so that the object distribution in the scan plane is acquired in the monitored zone by the distance and angle of recognized objects.

In safety engineering, the application entails recognizing unauthorized intrusions into protected fields and thereupon generating a safety-directed shut-down signal. If therefore a person appears within the protected field in front of the vehicle, the vehicle is braked to avoid an accident.

A special application in which vehicles are secured is formed by storage and logistics centers. The aisles between the storage racks are in this respect dimensioned as narrow as possible to save storage space. Depending on the storage facility type, the aisles are traveled on by fully automatic storage systems or by special very narrow aisle (VNA) trucks. These vehicles are often driverless and travel on the aisles in an automated manner or are positively driven, for example along inductive guide rails. If the presence of persons in the aisles is allowed, the vehicles must be equipped with securing systems to avoid accidents.

For this purpose, a respective laser scanner monitors a protected field in the direction of travel and reversing of the vehicle. Conventionally, in this respect, static protected fields are used which therefore always have the same geometry. Due to inaccuracies such as uneven floors, irregularities in the guide rails, lurching movements of the vehicle or inaccurate positioning of the truck in the very narrow aisle, the protected fields having a length of seven meters or in the order of magnitude of up to ten meters occasionally abut the stack feet or the stack contents. The laser scanners recognize this as a protected field intrusion and automatically cause the vehicle to make an emergency stop.

A known counter-measure is to narrow the protected fields to a point, that is to taper them in a trapezoidal shape from a specific distance from the vehicle onward to gain a little tolerance in the width or to work with protected fields which are as narrow as possible. However, this is done at the cost of the safety reserves and is only possible up to a specific limit even with a laborious manual optimization. A protected field which is too narrow and is angled due to the named inaccuracies could namely accidentally overlook a person standing to the side due to too small a coverage of the aisle. With the conventional solutions, there are thus regularly unnecessary and unwanted safety shut-downs when the protected field reaches its outer limit.

A storage system and storage process are known from DE 103 07 232 A1 in which the driverless transport system is not positively driven. Instead, a laser-controlled positioning system is used which has spatially distributed stationary reference marks which are sampled by laser to determine the position of the driverless transport system and to regulate its direction of travel. A safety system for accident avoidance is, however, not addressed.

DE 20 2005 466 U1 describes an apparatus for detecting objects using optoelectronic sensors at a driverless transport system. Protected fields spanned by the sensors change dynamically to adapt to the speed and to the direction of travel. The dynamic adaptation thus takes place solely due to control data of the vehicle. An adaptation of protected fields to external circumstances is not discussed.

It is therefore the object of the invention to provide an optoelectronic sensor for securing a vehicle which can deal better with inaccuracies in position with respect to path borders.

This object is satisfied by an optoelectronic sensor in accordance with claim 1 and by a method for the monitoring the environment in accordance with claim 11. The solution starts from the basic idea of adapting protected fields dynamically to the external borders of the path. That is, instead of statically always monitoring a region directly in front of the vehicle, it is endeavored to fit the protected field dynamically into the path. Inaccuracies in the travel of the vehicle are thus robustly compensated.

The invention has the advantage that erroneous shut-downs due to the path borders are considerably reduced or completely prevented. The availability is increased by the intelligent protected field adaptation to the movement and position of the vehicle with respect to the path. Instead of the conventional protected fields tapered or narrowed at the cost of the safety reserves, wider protected fields are used, whereby the detection capability of persons and thus the safety is increased. The configuration is substantially simplified because a manual adaptation of protected fields is dispensed with.

A dynamic adaptation means that the protected fields are changed at each new vehicle position or cyclically in short time intervals preset by the safety demands. During shorter time intervals within which neither a person can approach critically close to the vehicle nor an abutment of the protected field at the border is to be expected, no dynamic adaptation has to take place.

The protected field preferably has a longitudinal extent dependent on the speed of the vehicle approximately in the direction of travel and has a preset lateral extent adapted to the vehicle and/or to the path. Depending on the speed, only a part of the maximum longitudinal extent is necessary as long as the braking procedure is still safely concluded after the latest conceivable detection of a person. Corresponding protected field lengths can be stored in a table or can be determined from the speed using a calculation rule. The availability is thus further increased. A preset width of the protected field which is as large as possible and which does not result in erroneous shut-downs by the border due to the fitting in accordance with the invention increases safety. If the protected field is rectangular, this safety reserve is maintained over the total length.

The evaluation unit is preferably configured to vary the two parameters of angle of rotation and offset of the protected field with respect to a center axis of the vehicle in the dynamic fitting. The position of the protected field is thus only detected in two parameters and can be optimized with little effort. For example, a brute-force approach is even conceivable in which all combinations of angles of rotation and offset are worked through at a specific discrete precision.

The evaluation unit is preferably configured first to fix a main angle of rotation and a main offset of the protected field on the travel on a path section and to determine a differential readjustment angle of rotation during the continued travel. In very graphical terms, this can be compared with a rocket which is initially directed to its target and is then readjusted during flight to keep the desired course. Transferred to a storage facility, first, on the entry of the vehicle into a very narrow aisle, the major adaptation for the protected field is carried out via the main angle of rotation and the main offset and then, during the traveling through and starting from this initial alignment, only the differential deviation is determined. This process only has to examine a very small parameter space, is thus considerably faster than a complete working through with a quadratic effort and is therefore substantially more suitable for the real-time evaluation usually required in practice. Optionally, a readjustment offset can also be calculated.

The evaluation unit is preferably configured to determine the main angle of rotation and/or the readjustment angle of rotation as that angle at which the sum of the two distances of a longitudinal axis of the protected field is maximized with respect to the borders at both sides of the path. In this respect, the distance is as usual defined as the shortest perpendicular from the longitudinal axis to a point of the border. This corresponds to the requirement that no part or point of the border may be in the potential protected field. In this procedure, expressed again in other words, a longitudinal axis is in each case laid in the direction of an angle of rotation to be tested. The next closest point to this longitudinal axis on the left hand border and the next point on the right hand border are then sought over the longitudinal extent of the potential protected field. The sought angle of rotation is that angle at which the sum of the distances of these two points from the longitudinal axis is the largest to accommodate a protected field which is as wide as possible. The optimum angle of rotation can, for example, be located by iterative working through in discrete angular steps. The difference for the location of the main angle of rotation with respect to the readjustment angle of rotation is not in the optimization rule, but rather in the test angular range within which the maximum is sought. The effort for this procedure is only linear.

The evaluation unit is preferably configured to determine the main offset and/or a readjustment offset so that the central longitudinal axis of the protected field has the same distance from the borders at both sides of the path. On the location of the angle of rotation, the individual distances from the borders are also determined at both sides for the optimization of the sum. A simple averaging is thus sufficient to determine the required offset for the centration of the longitudinal axis. The offset therefore only requires a simple calculation with the smallest, constant calculation time and does not change any aspect of the only linear effort of the total procedure. The main offset and the readjustment offset are determined in the same manner, with naturally the respective associated angle of rotation, that is the main angle or rotation or the readjustment angle, being used as the basis.

The evaluation unit is preferably configured to seek the main angle of rotation in an environment of the angle given by the direction of travel with a first precision and the readjustment angle of rotation in an environment of the main angle of rotation with a second precision. For the main angle of rotation, the test angular range lies around the angle 0 defined by the direction of travel, whereas for the readjustment angle, the test angular range is laid around the main angle of rotation. Since all too large deviations are no longer to be expected in the readjustment angle of rotation, its test angular range can also be selected as narrower. The evaluation then works faster provided the first and second inaccuracies are the same or the readjustment angle of rotation is sought with a higher resolution of, for example, $1/10°$ with respect to, for example, only $2°$ for the main angle of rotation.

The evaluation unit is preferably configured to output a stop signal or a brake signal when no protected field can be fit into the borders to the demanded dimensions. Then, only a narrower or shorter protected field would be possible than required by the safety requirements. The failure of the fitting has to be caused by an object or by an unexpected narrowing of the path and is therefore considered an unpermitted protected field intrusion. If, conversely, a protected field dimensioned in accordance with the safety demands is fit in, this means that the path is free. There is no space for a person beside the protected field due to its demands and there is therefore no risk. The fit of the protected field thus simultaneously implies the otherwise customary monitoring of a protected field for unauthorized intrusions since it is actually a condition of fitting that the protected field does not contain any objects.

Provision is made in an advantageous further development to equip a vehicle with a sensor in accordance with the invention, with the vehicle being a driverless or positively driven transport system, in particular a high rack service truck or a fork lift truck, and the path being a straight aisle in a storage facility, in particular a high rack storage facility. The term vehicle is to be understood very widely and includes every mobile machine, that is also a robot. The monitored zone of the sensor is the section of the path in the direction of view of the sensor. As a rule, only the driverless transport system or the very narrow aisle truck fit into a very narrow aisle in a high rack storage facility; a person cannot escape to the side. A securing is therefore particularly important. At the same time, due to the very narrow aisles, the sensitivity with respect to inaccuracies of the position of the very narrow aisle truck is particularly high so that a fit of protected fields substantially improves the availability.

In this respect, spacer elements are particularly preferably provided for bordering the path, in particular only at the start of the path. A deterministic situation is thus created which is independent of the respective state of the path, in particular of the content of racks bordering the path. It is sufficient due to the orientation in the main direction in a preferred embodiment of the invention to attach the spacer elements only to the entry of an aisle with considerably reduced effort.

A first sensor is preferably provided at the vehicle for warning field monitoring/protected field monitoring in the direction of travel and second sensor for warning field monitoring/protected field monitoring against the direction of travel. The rear approach to a moving vehicle is also a source of danger, particularly when reverse travel is possible, which is frequently provided due to the lack of turning possibilities and the often very long aisles.

The method in accordance with the invention can be further developed in a similar manner and shows similar advantages. Such advantageous features are described in an exemplary, but not exclusive manner in the subordinate claims dependent on the independent claims.

Figure 3A:
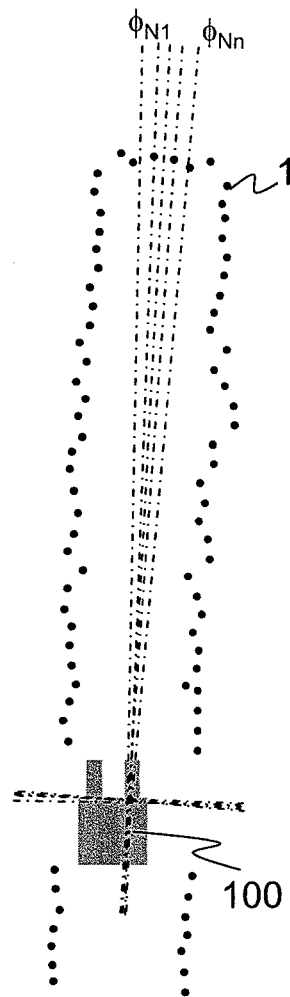
Figure 3B:
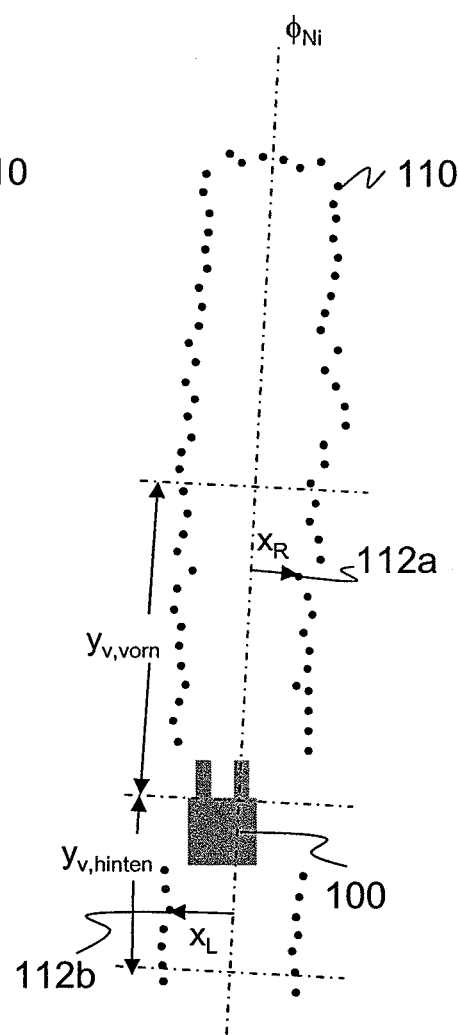
Figure 3C:
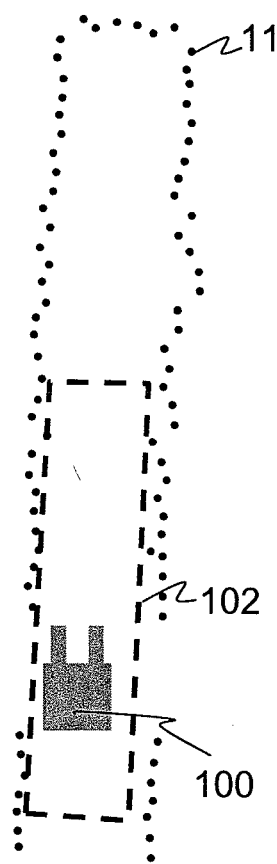
Figure 4:
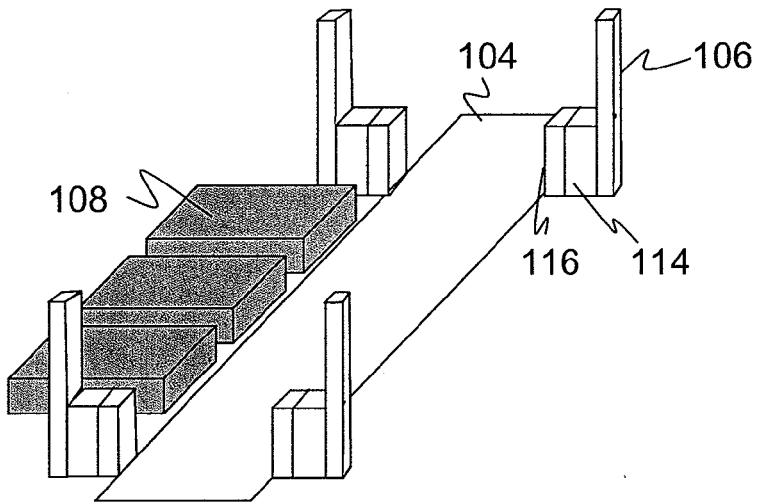
Figure 5:
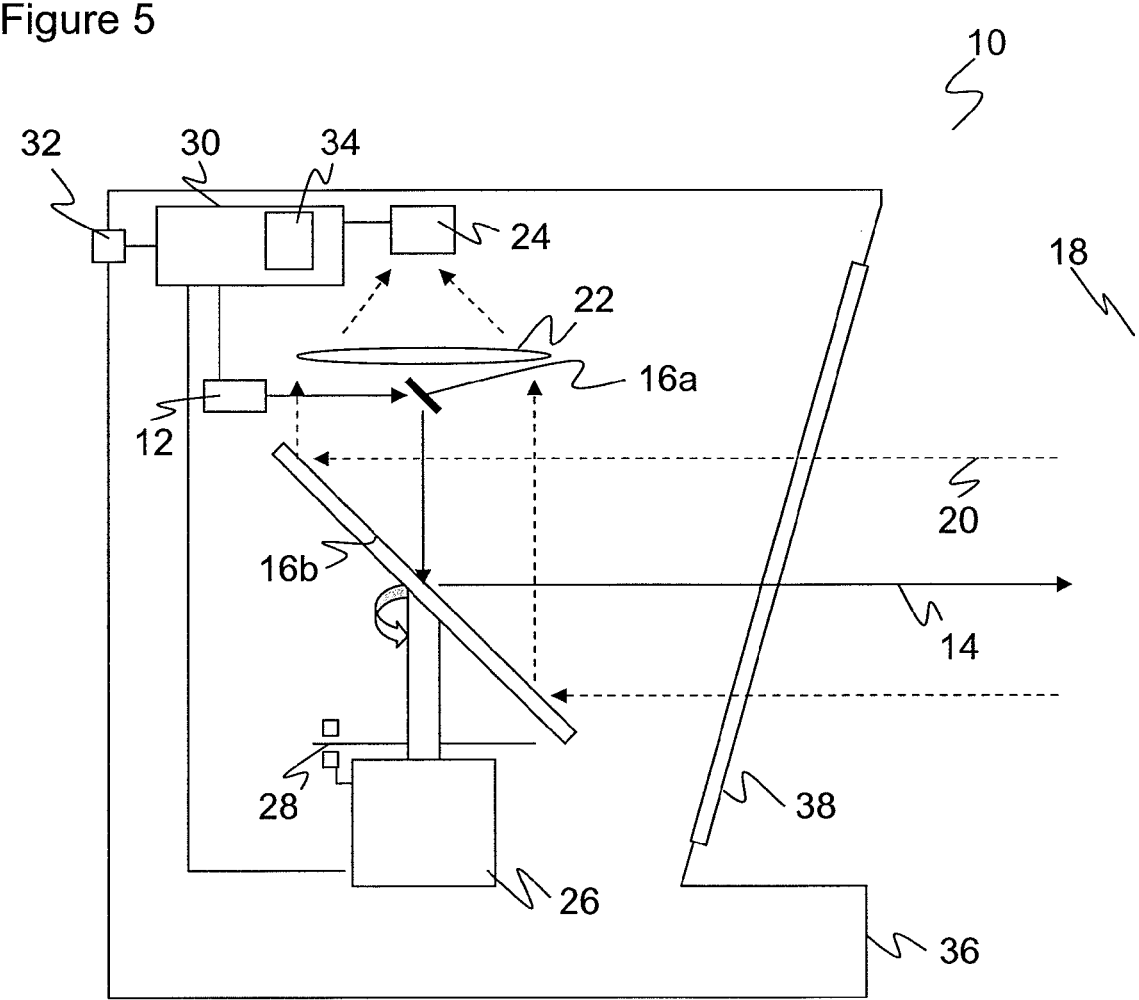

The invention will be explained in more detail in the following also with respect to further features and advantages by way of example with reference to embodiments and to the enclosed drawing. The Figures of the drawing show in:

FIG. 1 a plan view of an aisle in a rack storage facility having a vehicle which has a sensor in accordance with the invention for the dynamic fitting of protected fields;

FIGS. 2*a-c* plan views of the borders of the aisle determined by the sensor in accordance with the invention for explaining the location of the initial main angle of rotation and the main offset on the traveling of the vehicle into the aisle;

FIG. 3a-c plan views similar to FIG. 3 for explaining the location of differential readjustment angles of rotation and different readjustment offset on the further travel of the vehicle through the aisle:

FIG. 4 a schematic three-dimensional view of the aisle for explaining shadowing effects and position marks; and FIG. 5 a schematic sectional representation of a sensor in accordance with the invention which is made as a laser scanner.

The operation of a distance-measuring laser scanner will first be described with reference to FIG. 5 as an embodiment of a sensor 10 in accordance with the invention. Other distance-measuring sensors such as stereo cameras or camera chips based on the time of flight of light, for instance in accordance with the principle of photon mixing detection, are known per se and can be used instead of the laser sensor.

A light beam 14 which is generated by a light transmitter 12, for example by a laser, and which has individual light pulses is directed into a monitored zone 18 via light deflection units 16a-b and is there remitted by an object which may be present. The remitted light 20 again arrives back at the safety scanner 10 and is detected there by a light receiver 24, for example a photodiode, via the deflection unit 16b and by means of an optical receiving system 22.

The light deflection unit 16b is made as a rule as a rotating mirror which rotates continuously by the drive of a motor 26. The respective angular position of the light deflection unit 16b is detected via an encoder 28. The light beam 14 generated by the light transmitter 12 thus sweeps over the monitored zone 18 generated by the rotational movement. If a reflected light signal 20 from the monitored zone 18 is received by the light receiver 24, a conclusion can be drawn on the angular position of the object in the monitored zone 18 from the angular position of the deflection unit 16b by means of the encoder 28.

In addition, the time of flight of the individual laser light pulses is determined from their transmission up to their reception after reflection at the object in the monitored zone 18. A conclusion is drawn on the distance of the object from the safety scanner 10 from the time of flight of light while using the speed of light. This evaluation takes place in an evaluation unit 30 which is connected for this purpose to the light transmitter 12, to the light receiver 24, to the motor 26 and to the encoder 28. Two-dimensional polar coordinates of all objects in the monitored zone 18 are thus available via the angle and the distance.

The actual aim of the evaluation is to provide a safety signal to a safety output 32 (OSSD, output signal switching device) to trigger the braking or an emergency stop of a vehicle as required. For this purpose, the evaluation unit 30 calculates the location of an object in the monitored zone 18 via the angular data and the distance data. A check is made in a protected field adjustment unit 34 whether a two-dimensional protected field having minimum dimensions defined by safety demands can be dynamically adapted in position and/ or geometry so that no infringing protected field intrusions are present. Depending on the result, the evaluation unit 30 switches the safety output 32. The dynamic protected field adaptation in accordance with the invention will be described in detail in the following with reference to FIGS. 1 to 4.

The named functional components are arranged in a housing 36 which has a front screen 38 at the front side, that is in the region of the light exit and of the light entry. The front screen 38 is angled to avoid direct reflections into the light receiver 24 so that the light beam 14 and the front screen 38 include an angle other than ninety degrees. The evaluation unit 30 with the protected field fitting unit 34 can, deviating from the representation, also be implemented totally or partly outside the sensor 10. It is furthermore conceivable to collate the data of a plurality of sensors 10 and to evaluated them for safety-critical events together.

FIG. 1 shows a simplified plan view of a very narrow aisle truck 100 which monitors a protected field 102 in the travel direction by means of a sensor 10. If the sensor 10 recognizes an object in its protected field 102, a brake command or emergency stop command is output to the very narrow aisle truck 100 to avoid an accident. Optionally, an additional warning field positioned in front is provided at the margin of the protected field 102. Intrusions into the warning field do not directly result in an emergency stop, but rather first in a warning, for example the lighting up of a warning lamp or the sounding of a horn. A person should thus be given the opportunity to avoid the actual protected field intrusion in good time so that operation does not have to be interrupted. The warning can be associated with a precautionary measure, for instance a speed reduction or the avoidance of an acceleration. In contrast to an emergency stop, the very narrow aisle truck 100 does not have to be separately released after such a precautionary measure, but can rather return to uninterrupted operation on its own with a protected field and warning field which is free again.

The very narrow aisle truck 100 runs on the very narrow aisle 104 of a high rack storage facility. The path is thus tightly bordered at both sides by the racks which are shown in FIG. 1 as rack feet 106 and various pallets 108. Even though the invention is described for this example of a very narrow aisle truck 100 and the very narrow aisle 104 as a path bordered at both sides, it nevertheless covers other vehicles, other paths and other borders.

The protected field 102 is aligned with its longitudinal extent in the direction of the aisle and is centered in the aisle. In this manner, it fits ideally into the aisle with preset geometry. It can easily be recognized that a static protected field of the same dimensions centered in front of the very narrow aisle truck 100 in the direction of travel would pass through the borders of the very narrow aisle 104. In this case, an emergency stop of the very narrow aisle truck 100 is triggered because the protected field is not free although the very narrow aisle 104 in front of the very narrow aisle truck 100 is free.

Provision is made in accordance with the invention for this reason to bring the protected field directly into the shown deviating position with respect to the very narrow aisle truck 100. The fitting 102 is generally conceivable in any manner. The optimization object is simplified if the position of the protected field 102 is set by only two parameters, namely an angle of rotation $\phi$ about which the longitudinal axis of the protected field 102 is tilted with respect to the direction of travel and an offset $\Delta x$ of the center axis of the very narrow aisle truck 100 with respect to the center axis of the protected field 102. The value of $\Delta x$ is to be adapted when the sensor 10 is, deviating from the representation of FIG. 1, not arranged centered on the very narrow aisle truck 100.

The sensor 10 fits the protected field 102 in accordance with a method immediately to be described into the very narrow aisle 104 using the parameter pair $\phi$, $\Delta x$. If values are found for $\phi$, $\Delta x$, with which the protected field 102 remains without an unauthorized object intrusion both in the longitudinal direction and in the transverse direction with a minimum extent preset by safety demands, the safety output 32 releases the further travel and otherwise triggers an emergency stop. The desired longitudinal extent in this respect preferably depends on the required braking distance and thus on the travel speed to tolerate a closer approach of persons at lower speeds for higher availability.

FIGS. 2 and 3 illustrate a preferred two-step process for locating suitable values for $\phi$ and $\Delta x$. In a first step to be explained with reference to FIG. 2, on the entry of the very narrow aisle truck 100 into the very narrow aisle 104, a general rotation is designated as the main angle of rotation $\phi_H$ and a general lateral displacement toward the center axis of the very narrow aisle 104 designated as $\Delta x_H$ are determined once. In a second step shown in FIG. 3 which repeats regularly during the travel through the very narrow aisle 104, dynamically smaller rotations about the main angle of rotation $\phi_H$ are compensated by a readjustment angle of rotation $\phi_N$ and a smaller additional offset with respect to the main offset $\Delta x_H$ by a readjustment offset $\Delta x_N$. In this manner, the protected field and warning field are intelligently evaluated.

The location of the main angle of rotation $\phi_H$ and of the main offset $\Delta x_H$ will now be explained with reference to FIG. 2. The sensor 10 does this when the controller of the very narrow aisle truck 100 signals the entry into a very narrow aisle 104 to it. The sensor 10 first detects the very narrow aisle 104 with its border points 110 with a scan. These border points 110 are transformed into a global coordinate system to have a common reference for the cooperation with further sensors, for example a further sensor 10 which monitors the rear region.

As shown in FIG. 2a, longitudinal axes with different test angles of rotation $\phi_{H1}$ . . . $\phi_{Hn}$ are laid in the origin of the coordinate system and vary, for example, uniformly between a minimal and maximal rotation to be expected preset by the configuration. The associated perpendicular transverse axes are also drawn in.

As illustrated in FIG. 2b, the next closest border point 112a-b to the left and to the right is sought for each part angle of rotation $\phi_{Hi}$ in that the distance, that is the length of the perpendicular on the longitudinal axis of the test angle of rotation $\phi_{Hi}$, of all border points 110. is compared In this respect, the longitudinal axis divides the border points 110 into a left portion and a right portion. Only border points 110 are included which observe a maximum distance $y_{max}$ from the very narrow aisle truck, where $y_{max}$ corresponds, for example, to the preconfigured longitudinal extent of the sought protected field 102 at top speed. A restriction of the search area in the transverse direction is also possible.

The main angle of rotation $\phi_H$ is that test angle of rotation $\phi_H$ at which the sum of the distances $x_L + x_R$ of the closest border points found for the respective test angle of rotation $\phi_H$ becomes maximum. The widest possible protected field 102 can be adjusted at this main angle of rotation $\phi_H$. The amount of the sum $x_L + x_R$ must be larger than the preconfigured width of the protected field 102; otherwise, in the then current situation, the required protected field 102 cannot be fit in and an emergency stop is output. The longitudinal axis does not at all keep a finite distance from the border within the extent of the protected field 102 at both sides at all test angles of rotation $\phi_{Hi}$. Such test angles of rotation $\phi_{Hi}$ cannot be considered for the main angle of rotation $\phi_H$ independently of the value of the sum $x_L + x_R$.

FIG. 2c illustrates the located main angle of rotation $\phi_H$. Since the orientation is thus known, the main offset $\Delta x_H$ can also be calculated quickly since it has to be selected such that $x_L = x_R$ applies to the offset longitudinal axis. $\Delta x_H = \frac{1}{2}(x_L + x_R)$ therefore applies. The output values of both parameters $\phi_H$, $\Delta x_H$ are thus determined on the entry into the very narrow aisle. For reasons of safety, a check can be made by a further scan whether the protected field 102 thus specified is actually free of unauthorized objects and whether the border points 110 continue to lie at their expected location.

During the travel through, as now explained with reference to FIG. 3, differential corrections of the initial parameters $\phi_H$, $\Delta x_H$ are carried out and for this purpose a readjustment angle of rotation $\phi_N$ and a readjustment offset $\Delta x_N$ are dynamically determined. The process is generally the same as in the determination of the main angle of rotation $\phi_H$ and of the main offset $\Delta x_H$. The difference lies in different test angles of rotation $\phi_{Ni}$ and in different border points 110 (ROI, region of interest) considered. For example, speed-dependent distance conditions $y_{v,vorn}$ and $y_{v,hinten}$ are set at the border points 112a, 112b instead of the constant $y_{max}$.

As shown in FIG. 3a, a plurality of longitudinal axes are again drawn in the direction of test angles of rotation $\phi_{N1}$ . . . $\phi_{Nn}$. In contrast to FIG. 2a, these longitudinal axes are, however, offset by $\Delta x_H$ with respect to the center axis of the very narrow aisle truck 100 and the test angles of rotation $\phi_{Ni}$ vary in a test angular range about the main angle of rotation $\phi_H$. The test angular range is preset by configuration and can be identical to, but also much tighter than that for locating the main angle of rotation $\Delta_H$ since now a good initial value is already present by the main angle of rotation $\phi_H$. This smaller test angular range can be used for a faster evaluation or for a higher resolution in the same calculation time.

In a very analog manner to FIG. 2b, as shown in FIG. 3b, each readjustment angle of rotation $\phi_{Ni}$ is then checked and the ideal readjustment angle of rotation $\phi_N$ is located with reference to the maximum sum $x_R + x_L$ of the distances of the next closest border points 112a, 112b. In the example, the next closest left border point 112a is a rear point. This is naturally only to be understood by way of example. In addition, this requires either a further sensor 10 or a sensor having practically a 360° field of view. If securing should only take place in the direction of travel, no rear border points 110 are determined and would also not be relevant. Nor do any rear border points 110 occur in the determination of the main angle of rotation because on the entry into a very narrow aisle 104 usually no border is present or only borders not belonging to the very narrow aisle 104 are present to the right and to the left at least over a specific distance at the rear.

The readjustment $\Delta x_N$ offset can also be calculated from the readjustment angle of rotation $\phi_N$ thus located, again as an arithmetic mean of $x_L$ and $x_R$ to align the protected field 102 as shown in FIG. 3c in the direction of the readjustment angle $\phi_N$ and to center it in the very narrow aisle 104. The calculation of the readjustment angle of rotation $\phi_N$ is, for example, useful if the position of the protected fields 102 should be displayed in the very narrow aisle 104. The parameter readjustment angle of rotation $\phi_N$ is, however, actually only a linguistic illustration since it is now sufficient to check whether the sum $x_L + x_R$ is larger than the demanded width of the protected field 102. It is thus clear that a protected field 102 can be fit to the minimum width. It is no longer required for the decision on an emergency stop also actually to fit this protected field 102. The optimum for the readjustment angle of rotation $\phi_N$ also no longer actually has to be located. It is sufficient if any test angle of rotation satisfies all demands, that is makes a free protected field 102 fittable. The process can then be interrupted; no emergency stop is triggered at any time. It is insignificant and purely cosmetic whether perhaps another protected field 102 would have been even better fittable since the safety demands are already satisfied.

FIG. 4 shows a schematic three-dimensional view of a very narrow aisle 104 from the view of the very narrow aisle truck 100. If the sensor 10 has a scan plane at the level of the pallets 108, the rack feet 106 are possibly hidden in dependence on the storage facility content. The situation is thus not deterministic in the sense that the sensor finds different border points 110 depending on the storage facility content. To prevent this and thus to make the evaluation more robust, spacers 114 can be introduced at the racks. They preferably bear reflector marks 116 at the level of the scan level which are recognized reliably by the sensor 10 at least from the distance of a maximum conceivable protected field length. When the rack feet 106 are the parts projecting furthest into the very narrow aisle 104 and it is ensured that the pallets 108 do not overhang, the spacers 114 can be dispensed with. The recognition is, however, also facilitated for the sensor when reflector marks 116 are attached to the rack feet 106.

If the protected field fitting takes place in two steps, it is often sufficient only to attach spacers 114 or boundary marks 116 at the entrance to the very narrow aisle 104. The sensor 10 thus reliably determines the main angle of rotation $\phi_H$ and the main offset $\Delta x_H$. On the basis of these two parameters, the protected field fitting Into the very narrow aisle is also successful without additional spacers 114 and boundary marks 116 during the further travel through.

The very narrow aisle truck 100 moves in a positively driven manner through the very narrow aisle 104, for example with regard to inductive guide rails. Alternatively, however, the data of the sensor 10 can also be used for a free automatic navigation. This navigation is substantially facilitated by a deterministic environment such as is provided by spacers 114 and boundary marks 116. A special case of the automatic navigation is the braking at the end of a very narrow aisle 104 which forms a dead end. This is recognized in time as a warning field infringement of the fit protected field 104 and triggers the timely braking.

The invention claimed is:

1. An optoelectronic sensor (10), for a vehicle (100) which moves on a path (104) bordered at both sides, said optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in at least one of position and extent,
   wherein a safety output (32) is provided via which a stop signal or a brake signal can be output to the vehicle (100) by the evaluation unit (30, 34) on the recognition of a protected field intrusion, characterized in that the evaluation unit (30, 34) is furthermore configured to recognize borders (110) of the path (104) from the electric signals and to fit the protected field (102) dynamically into the borders (110)
   wherein the evaluation unit (30, 34) is configured to output the stop signal or brake signal when no protected field (102) of the required dimensions can be fitted into the borders (110).

2. A sensor (10) in accordance with claim 1, the sensor being a laser scanner.

3. A sensor (10) in accordance with claim 1, wherein the protected field (102) has a longitudinal extent dependent on the speed of the vehicle (100) approximately in the direction of travel and a preset transverse extent matched to at least one of the vehicle (100) and the path (104).

4. A sensor (10) in accordance with claim 3 wherein said protected field (102) is substantially rectangular.

5. A sensor (10) in accordance with claim 1, wherein the evaluation unit (30, 34) is configured to vary two parameters angle of rotation ($\Phi$) and offset ($\Delta_x$) of the protected field (102) with respect to a center axis of the vehicle (100) for fitting the protected field (102) dynamically into the borders.

6. A sensor (10) in accordance with claim 1, wherein the evaluation unit (30, 34) is configured first to fix a main angle of rotation ($\Phi_H$) and a main offset ($\Delta x_H$) of the protected field (102) while running on a path section (104) and to determine a differential readjustment angle of rotation ($\Phi_N$) during the continued travel on the path section (104).

7. A sensor (10) in accordance with claim 6, wherein the evaluation unit (30, 34) is configured to determine at least one of the main angle of rotation ($\Phi_H$) and the readjustment angle of rotation ($\Phi_N$) as that angle at which the sum ($x_L+x_R$) of the two distances of a longitudinal axis of the protected field (102) is maximized with respect to the borders (110) at both sides of the path (104).

8. A sensor (10) in accordance with claim 6, wherein the evaluation unit (30, 34) is configured to determine the main offset ($\Delta x_H$) and/or a readjustment offset ($\Delta x_H$) so that the central longitudinal axis of the protected field (102) has the same distance from the borders (110) at both sides of the path (104).

9. A sensor (10) in accordance with claim 6, wherein the evaluation unit (30, 34) is configured to seek the main angle of rotation ($\Phi_H$) in an environment of the angle given by the direction of travel with a first precision and the readjustment angle ($\Phi_N$) in an environment of the main angle of rotation ($\Phi_H$) with a second precision.

10. A vehicle (100) having an optoelectronic sensor (10), wherein the vehicle (100) is a driverless transport system which moves on a path (104) having borders on both sides, said optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in at least one of position and extent,
   wherein a safety output (32) is provided via which a stop signal or a brake signal can be output to the vehicle (100) by the evaluation unit (30, 34) on the recognition of a protected field intrusion,
   wherein the evaluation unit (30, 34) is furthermore configured to recognize said borders (110) from the electric signals and to fit the protected field (102) dynamically into the borders (110) and wherein the path (104) is a straight aisle in a storage facility and
   wherein the evaluation unit (30, 34) is configured to output the stop signal or brake signal when no protected field (102) of the required dimensions can be fitted into the borders (110).

11. A vehicle (100) in accordance with claim 10, wherein spacer elements (114) are provided to border the path.

12. A vehicle (100) in accordance with claim 11, wherein said spacer elements are provided only at the start of the path.

13. A vehicle (100) in accordance with claim 10 in the form of a high rack service truck for use in a high rack storage facility.

14. A vehicle (100) in accordance with claim 10, wherein a first sensor (10) is provided for protected field monitoring in the direction of travel and a second sensor (10) is provided for protected field monitoring against the direction of travel.

15. A vehicle (100) having an optoelectronic sensor (10), wherein the vehicle (100) is a driverless transport system which moves on a path (104) having borders on both sides, said optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in at least one of position and extent, wherein a safety output (32) is provided via which a stop signal or a brake signal can be output to the vehicle (100) by the evaluation unit (30, 34) on the recognition of a protected field intrusion, wherein the evaluation unit (30, 34) is furthermore configured to recognize said borders (110) from the electric signals and to fit the protected field (102) dynamically into the borders (110) and wherein spacer elements (114) are provided to border the path and wherein the evaluation unit (30, 34) is configured to output the stop signal or brake signal when no protected field (102) of the required dimensions can be fitted into the borders (110).

16. A vehicle (100) in accordance with claim 15, wherein said spacer elements are provided only at the start of the path.

17. A vehicle (100) in accordance with claim 15 in the form of a high rack service truck for use in a high rack storage facility.

18. A vehicle (100) in accordance with claim 15, wherein a first sensor (10) is provided for protected field monitoring in the direction of travel and a second sensor (10) is provided for protected field monitoring against the direction of travel.

19. A method for monitoring the environment of a vehicle (100) which moves on a path (104) bordered at both sides, wherein the monitoring takes place using an optoelectronic sensor (10), wherein the position of objects in the monitored zone is determined from electric signals acquired by conversion of received light, wherein it is recognized whether an unauthorized object is located within a protected field (102) dynamically changeable in position and extent, with a stop signal or brake signal being output to the vehicle (100) on recognition of a protected field intrusion, characterized in that borders (110) of the path (104) are recognized from the electric signals and the protected field (102) is dynamically fitted into the borders (110)

wherein one of a stop signal and a brake signal is output when no protected field (102) of the demanded dimensions can be fitted into the borders (110) and wherein two parameters angle of rotation ($\Phi$) and offset ($\Delta_x$) of the protected field (102) are varied with respect to a center axis of the vehicle (100) on the dynamic fitting.

20. A method in accordance with claim 19 wherein a laser scanner is used as said optoelectronic sensor.

21. A method in accordance with claim 19, wherein the vehicle is used in one of a driverless transport system and a positively driven transport system.

22. A method in accordance with claim 19 wherein said vehicle is used in a high rack storage facility.

23. A method in accordance with claim 19, wherein a main angle of rotation ($\Phi_H$) and a main offset ($\Delta x_H$) of the protected field (120) is first fixed on the running on a path section (104) and a differential readjustment angle ($\Phi_N$) is determined during the continued travel on the path section (104).

24. A method in accordance with claim 19, wherein at least one of the main angle of rotation ($\Phi_H$) and the readjustment angle of rotation ($\Phi_N$) is determined as that angle at which the sum of the two distances ($x_L + x_R$) of a longitudinal axis of the protected field (102) is maximized with respect to the borders (110) at both sides of the path (104).

25. A method in accordance with claim 24, wherein at least one of the main offset ($\Delta x_H$) and a readjustment offset ($\Delta x_N$) is determined so that the central longitudinal axis of the protected field (102) has the same distance from the borders (110) at both sides of the path (104).

26. A method in accordance with claim 24, wherein at least one of the main offset ($\Delta x_H$) and/or a readjustment offset ($\Delta x_N$) is determined so that the central longitudinal axis of the protected field (102) has the same distance from the borders (110) at both sides of the path (104).

27. An optoelectronic sensor (10), for a vehicle (100) which moves on a path (104) bordered at both sides, said optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in at least one of position and extent, wherein a safety output (32) is provided via which a stop signal or a brake signal can be output to the vehicle (100) by the evaluation unit (30, 34) on the recognition of a protected field intrusion, characterized in that the evaluation unit (30, 34) is furthermore configured to recognize borders (110) of the path (104) from the electric signals and to fit the protected field (102) dynamically into the borders (110)

wherein the evaluation unit (30, 34) is configured to vary two parameters angle of rotation ($\Phi$) and offset ($\Delta_x$) of the protected field (102) with respect to a center axis of the vehicle (100) for fitting the protected field (102) dynamically into the borders.

28. An optoelectronic sensor (10), for a vehicle (100) which moves on a path (104) bordered at both sides, said optoelectronic sensor having a light receiver (24) for the conversion of received light (20) into electric signals as well as an evaluation unit (30, 34) which is configured to determine the position of objects in a monitored zone of the sensor (10) from the electric signals and to recognize whether an unauthorized object is located within a protected field (102) dynamically changing in at least one of position and extent, wherein a safety output (32) is provided via which a stop signal or a brake signal can be output to the vehicle (100) by the evaluation unit (30, 34) on the recognition of a protected field intrusion, characterized in that the evaluation unit (30, 34) is furthermore configured to recognize borders (110) of the path (104) from the electric signals and to fit the protected field (102) dynamically into the borders (110)

wherein the evaluation unit (30, 34) is configured first to fix a main angle of rotation ($\Phi_H$) and a main offset ($\Delta x_H$) of the protected field (102) while running on a path section (104) and to determine a differential readjustment angle of rotation ($\Phi_N$) during the continued travel on the path section (104).

29. A method for monitoring the environment of a vehicle (100) which moves on a path (104) bordered at both sides, wherein the monitoring takes place using an optoelectronic sensor (10), wherein the position of objects in the monitored zone is determined from electric signals acquired by conversion of received light, wherein it is recognized whether an unauthorized object is located within a protected field (102) dynamically changeable in position and extent, with a stop signal or brake signal being output to the vehicle (100) on recognition of a protected field intrusion, characterized in that borders (110) of the path (104) are recognized from the electric signals and the protected field (102) is dynamically fitted into the borders (110)

wherein a main angle of rotation ($\Phi_H$) and a main offset ($\Delta x_H$) of the protected field (120) is first fixed on the running on a path section (104) and a differential readjustment angle ($\Phi_N$) is determined during the continued travel on the path section (104).

* * * * *